June 23, 1964 W. B. HILDMANN ETAL 3,137,874
BOOK BACKBONE, METHOD AND MACHINE
Filed April 2, 1963 9 Sheets-Sheet 1

Inventors:
William B. Hildmann
Edward C. Rankin
George C. Brock
By [signature] Atty.

Fig. 6.

June 23, 1964  W. B. HILDMANN ETAL  3,137,874
BOOK BACKBONE, METHOD AND MACHINE
Filed April 2, 1963  9 Sheets-Sheet 3

FIG. 7.

Inventors:
William B. Hildmann
Edward C. Rankin
George C. Brock
By [signature] Atty.

June 23, 1964 W. B. HILDMANN ETAL 3,137,874
BOOK BACKBONE, METHOD AND MACHINE
Filed April 2, 1963 9 Sheets-Sheet 8

Inventors:
William B. Hildmann
Edward C. Rankin
George C. Brock
By [signature] Atty.

United States Patent Office 3,137,874
Patented June 23, 1964

3,137,874
BOOK BACKBONE, METHOD AND MACHINE
William B. Hildmann and Edward C. Rankin, Oak Park, and George C. Brock, Chicago, Ill.; Mary Alice Rankin, executrix of said Edward C. Rankin, deceased, assignors to Brock and Rankin, Chicago, Ill., a corporation of Illinois
Filed Apr. 2, 1963, Ser. No. 270,501
31 Claims. (Cl. 11—2)

This application is a continuation-in-part of application 10,533, filed February 16, 1960, and now abandoned.

This invention pertains to the bookbinding arts and has as one of its principal objects the provision of a method for economical and expeditious manufacture of cloth hinged covers or casings with rounded, laminar backbones, said casings being of general application, but especially adapted to use in so-called loose-leaf binders.

A further object is the provision of a machine for forming book casings in accordance with the aforesaid method.

Viewed from another aspect the present disclosures afford a production method and machine for making cloth-jointed, round-backed casings according to certain constructions taught in Patent 2,772,427, in which the casings are characterized by greatly increased strength and enhanced appearance with respect to both the backbone and the joint or hinge structure.

According to the disclosures of the aforesaid patent, the backbone is constructed of at least two laminae or strips of fibre board, such as binder's board or tarboard joined by a suitable adhesive and curved to produce an arcuate section of great strength.

The disclosures of the aforesaid patent further teach the provision of a stepped edge or ledge along the two hinge edges of the backbone, by reason of which the hinge cloth is provided with space in which it can be accommodated to provide a flatter, better appearing hinge, and by virtue of which the hinge edges of the backbone are enabled to closely confront the juxtaposed edges of the cover boards, whereby certain additional strengthening is achieved.

Curved laminar backbones have been proposed heretofore in the bookbinding arts, but feasible and economical manufacturing methods for making such backbones have restricted the use thereof to a more costly class of book, involving operations wholly unsuited to mass production at minimized cost.

For example, one of the critical problems encountered heretofore in fabricating rounded fibre-board backbones has been the tendency for the backbone to lose its initial prescribed curvature and spring partly back toward the original and flatter shape, with consequent losses in strength, appearance, and uniformity.

According to the methods herein disclosed, a laminar curved backbone having very desirable utilitarian and manufacturing characteristics is constructed by coating the several backbone strips with a thermo-bonding adhesive, superposing the same, and subjecting the strips to a series of rounding deformations in heated dies.

The present disclosure also affords a machine for coating the backbone elements, registering the casing blanks and backbone elements, and progressively forming-up both the backbone structure and the casing joints in a continuous-flow process, which is rapid and economical and results in a uniform end product.

More detailed objects relate to the provision of a method and means for forming book casings with stiff, rounded, laminar backbone structures, by means of a thermobonding adhesive included between the interfaces of the laminae, and set simultaneously with the rounding thereof; with or without such further features as simulated headbands, concealed, recessed rivets for attachment of binding means, double-joined hinge joints, and backbone liner strips, all of which will more fully appear as the following description proceeds in view of the annexed drawings, in which:

According to the disclosures of the said patent, a feasible method for constructing rounded backbones for economical large-scale production consists in pre-rounding the several backbone strips and thereafter gluing the curved pieces together with a hard-setting hide glue, with the result that any subsequent change in curvature is negligible, and a very strong backbone is produced.

Such methods are especially suited to use with what are termed here "softer" paper boards of the class of binder's board and chip board, as distinguished from a harder board, such as tarboard.

It is further emphasized that the method disclosed in said patent contemplates not only preforming the separate backbone pieces or laminae before joining the same, but also contemplates the use of a hard-setting glue of the class of hide glues, well-known in the bookbinding trade.

According to the present disclosures, a successful method has been invented for simultaneously rounding and joining the two backbone strips in situ, and conjointly, by use of a thermobonding adhesive and certain tacking and forming operations which overcome the highly troublesome tendency of conjointly rounded backbone pieces to get out of register and to lose their prescribed curvature while in the forming dies or after leaving the latter. Moreover, this new method makes possible the free use of the relatively harder tarboards in a continuous-flow, machine-processed manufacturing method which produces the strongest binder of its class yet devised.

Figures 1, 2, 3, 4, 5, 5A:
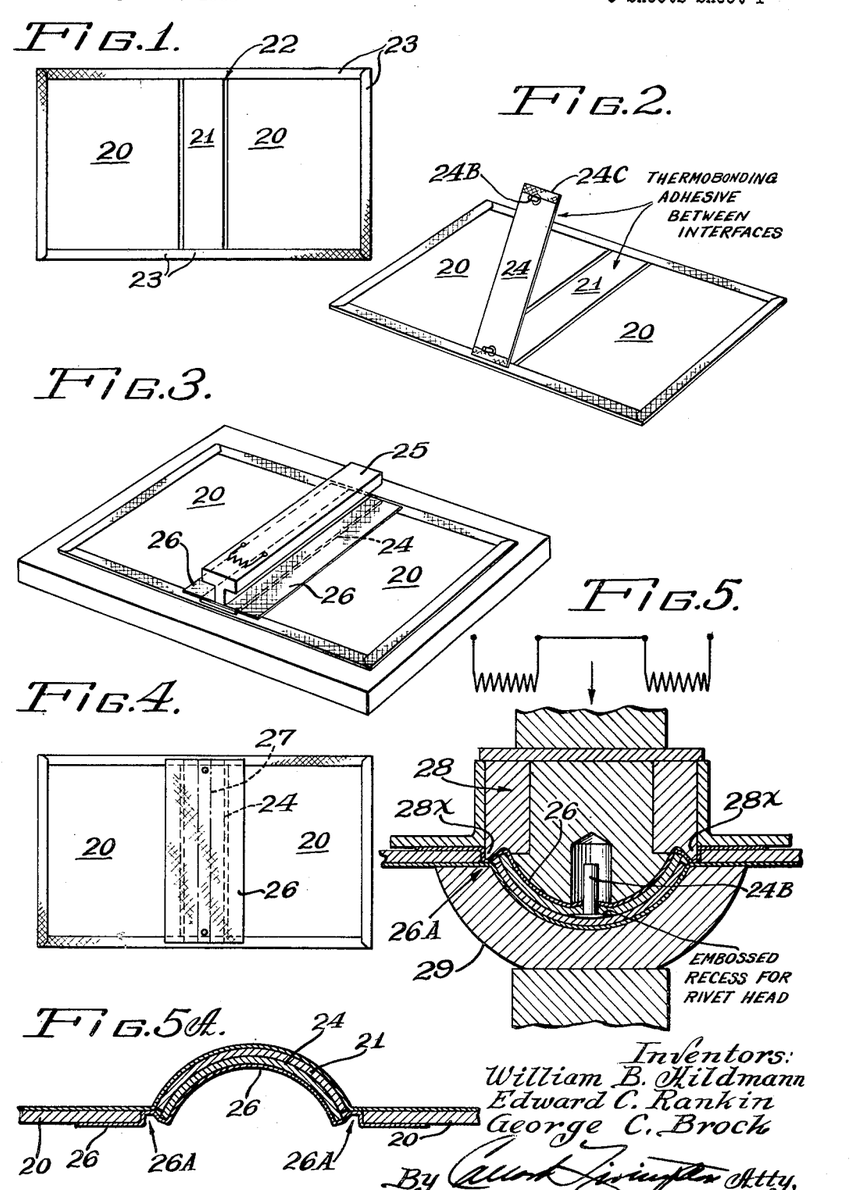
FIGS. 1 to 5A are diagrammatic views illustrative of the several steps of the new method as applied to a blank or "manufactured" casing.

More particularly, as illustrated in FIG. 1, the present method (like that of the aforesaid patent) begins with the usual "manufactured" casing, which consists of a pair of cover boards 20 of about 100-point board, hingedly joined to an outer backbone piece 21 of half-weight (about 50-point) board by an outer jacket 22 of binder's cloth glued over the outer faces of all three pieces, and having turned-in edges 23, it being noted that these roughed or "manufactured" casings are substantially flat.

As in FIG. 2, a half-weight (about 50-point) second or sister backbone piece 24 of identical dimensions with the outer piece, has one of its surfaces coated with a suitable thermobonding adhesive of the class of the vinyl acetate adhesives, which begin to set or bond upon initial application of a certain amount of heat, and thereafter bond fully, by continuing the heating for a time.

The coated secondary or sister backbone strip 24 is then placed (FIG. 3) in exact register upon the outer backbone piece 21 of the casing and a prepared, narrow liner strip 26 of binder's cloth, previously coated on one side with the thermobonding adhesive, is placed on the sister board, whereupon an initial heat is then applied by means of primary tacking dies 25 along a narrow median longitudinal band 27 to the now superposed liner and backbone pieces 21 and 24 in amount to effect an initial registration and tacking attachment of the two backbone pieces, and the liner cloth, only along the narrow band 27 (as depicted in FIG. 4).

The purpose of the median tacking is very important, as will presently appear.

In the next step of the process (FIG. 5), the casing with its now lined and partially or medially joined or tacked backbone pieces 21 and 24 is passed through a pair of heated, pressure-closed rounding dies 28, 29, which impart the prescribed curvature to the composite backbone structure. Upon cooling (which occurs rapidly after leaving the rounding dies) the backbone will retain its curvature without any objectionable relaxation or springing-back.

In the die-rounding operation, the medially joined backbones are subjected to an over-all heating and to an over-all rounding deformation, and the median tacking, heretofore emphasized, prevents the two pieces (and the liner) from slipping out of register as they are simultaneously forced down into the matrix to assume their full curvature.

Another highly important function of the aforesaid rounding operation is that of forming the joint, which is achieved by special jointing projections 28X on the forming dies, the result being the displacement of the exposed liner cloth portion 26A down into permanent juncture with the underlying hinge portion of the jacket cloth, as illustrated to magnified scale in FIG. 5A.

In summary, the new method in its essential aspects provides for coating a face of the sister backbone strip with a fast thermobonding adhesive, and superposing the sister strip (and, where used, a liner coated with the same adhesive) in register upon the main or outer backbone strip, and then partially joining or tacking the two strips (and liner, if used) along a narrow median band, parallel to the axis of curvature, by application of heat and pressure to the region of said band, and thereafter curving the tacked composite backbone assembly under over-all heat and pressure, and forcing the liner cloth (if any) down into adhesion with the hinge cloth along the cover joints.

For purposes of rapid mass-production of casings by this method, it is further contemplated that the rounding and thermobonding operations be carried out in a succession of stages following the tacking operation in order to procure the desired curvature progressively and to avoid holding a casing at any one forming station for too long a time.

When the novel method is applied to a continuous-flow manufacturing process, the application of the adhesive, the registration of the several backbone pieces, and the tacking, forming, and jointing operations are performed by mechanism now to be described.

Figure 6:
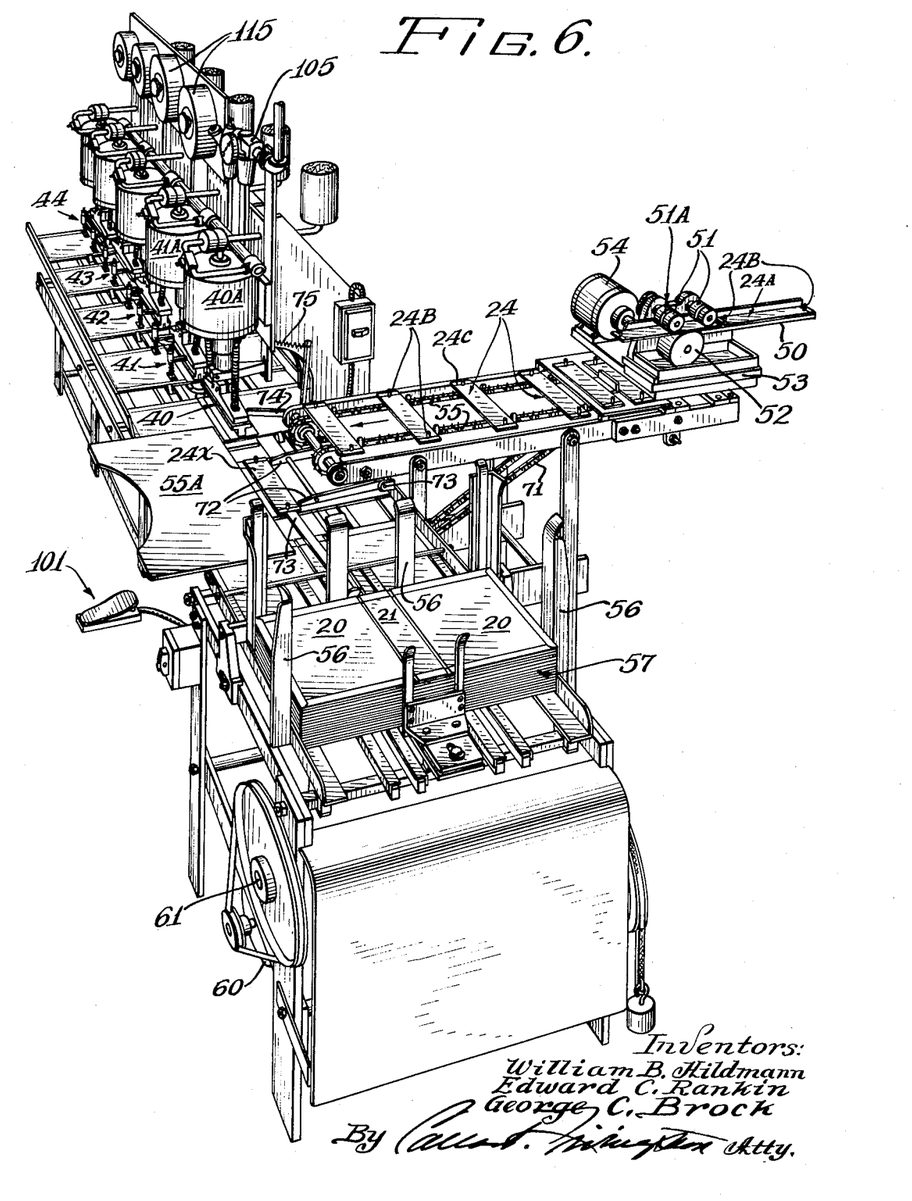
FIG. 6 is a perspective view of a machine for the practice of the new method.

The case-forming machine shown in FIG. 6 includes an elongated forming bed having a plurality of forming stations disposed therealong, at each of which is a set of electrically-heated, pneumatically-operated dies.

The primary or tacking die means 40 is followed by four progressive rounding dies 41, 42, 43, 44, also electrically heated and pneumatically actuated.

Two synchronized infeeds are provided, one for the rough or casing blanks 20–21, and another for the sister backbone strips 24, etc.

The infeed for the backbone strips includes a bed portion 50, upon which the backbone strips are placed, as at 24A, and manually fed in between a set of feed rollers 51, and an adhesive-applying roller 52, which rotates through a liquid thermobonding adhesive contained in a trough 53. Rollers 51 are gear-driven from a small electric motor 54, at slow speed with roller 52.

The machine herein disclosed is adapted to make a type of casing provided with blind rivet means for attachment of a conventional loose-leaf ring-binder mechanism (not shown) to the inside of the composite backbone.

Figure 10:
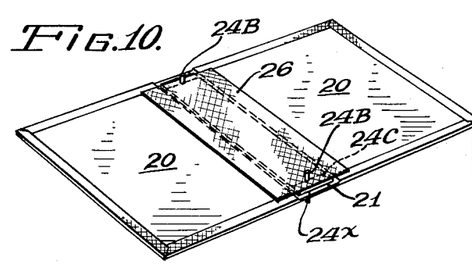
FIG. 10 is a perspective detail of the casing blank of FIG. 9 with the sister backbone and liner cloth applied and ready for movement into the dies.

Accordingly, in the usual case, the sister backbone strips 24, 24A, are all provided with a pair of rivets 24B, the heads of which are seated in depressions or embossments formed in the strips by driving the rivets into the strips with sufficient force to punch their own holes therethrough and drive the heads into the stock to form said depressions. These operations are performed by separate apparatus (not shown) before the strips 24 reach the infeed. The rivets 24B appear in FIG. 10 and also to enlarged scale in FIG. 5.

Figure 9:
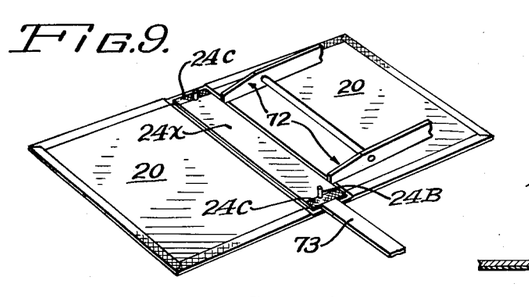
FIG. 9 is a perspective detail of a blank casing with a sister strip engaging the registering guide means.

In FIG. 9 it will be observed that the sister strips are preferably provided with reinforcing and dressing headbands 24C, adapted to simulate a true headband, and also serving to seal-off the ends of the strips against moisture. These headband strips 24C are strips of cloth which match the appearance of the cover material and which are folded around the heading edges of the strips and adhered thereto.

In order to clear the rivets 24B, the feed rollers 51 are provided with circumferential grooves 51A deep enough to freely pass said rivets.

After passing through the so-called gluing rollers 51–52, the adhesively coated strips 24 are placed upon a pair of slow and intermittently moved conveyor chains 55 running crosswise of the bed and toward the assembly station or position 55A, located opposite the discharge end of this infeed. The cases advanced by the casing infeed are halted before this assembly position.

The infeed for the casing blanks 20–21 (FIG. 6) includes a hopper defined by adjustable uprights 56 for confining a stack 57 of the flat casings.

Figure 7:
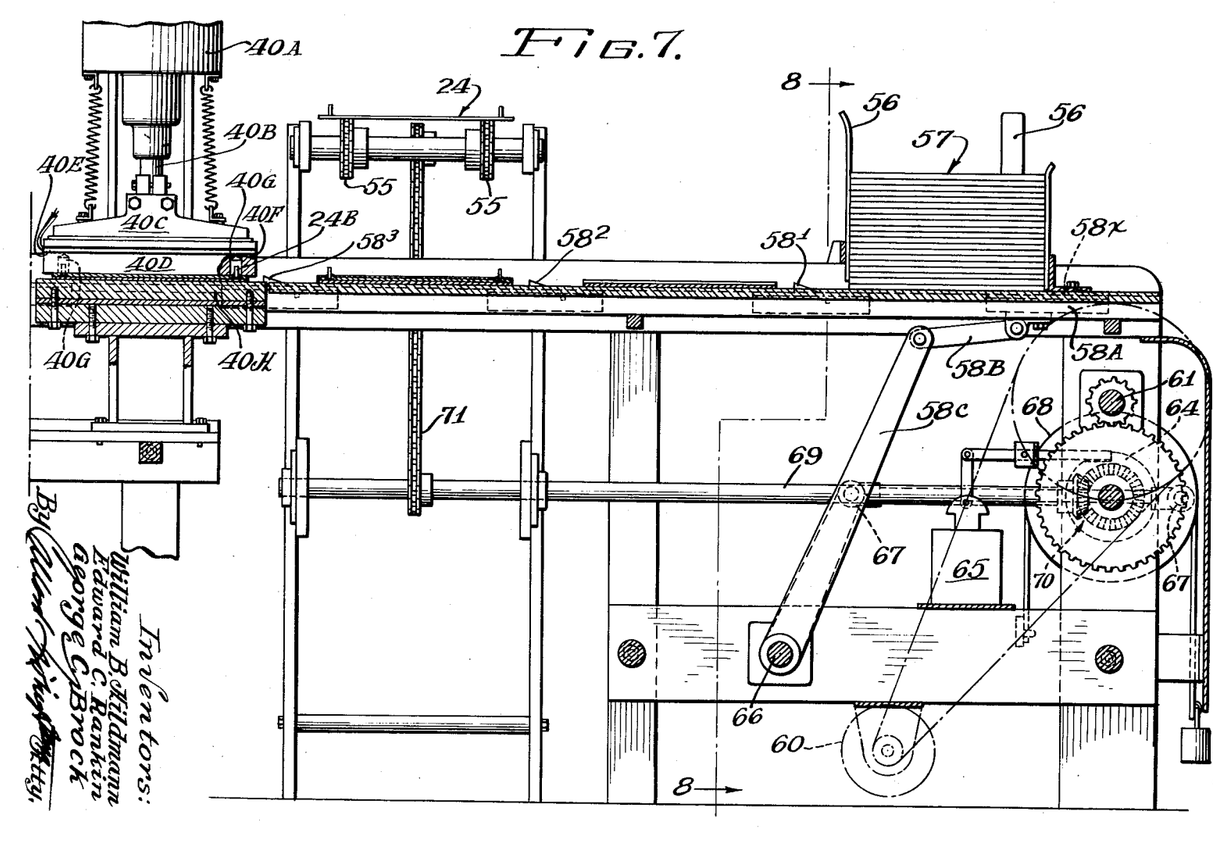
FIGS. 7 and 7A are complementary views depicting a median, longitudinal, vertical cross-section through the forming bed of the machine of FIG. 6.
Figure 8:
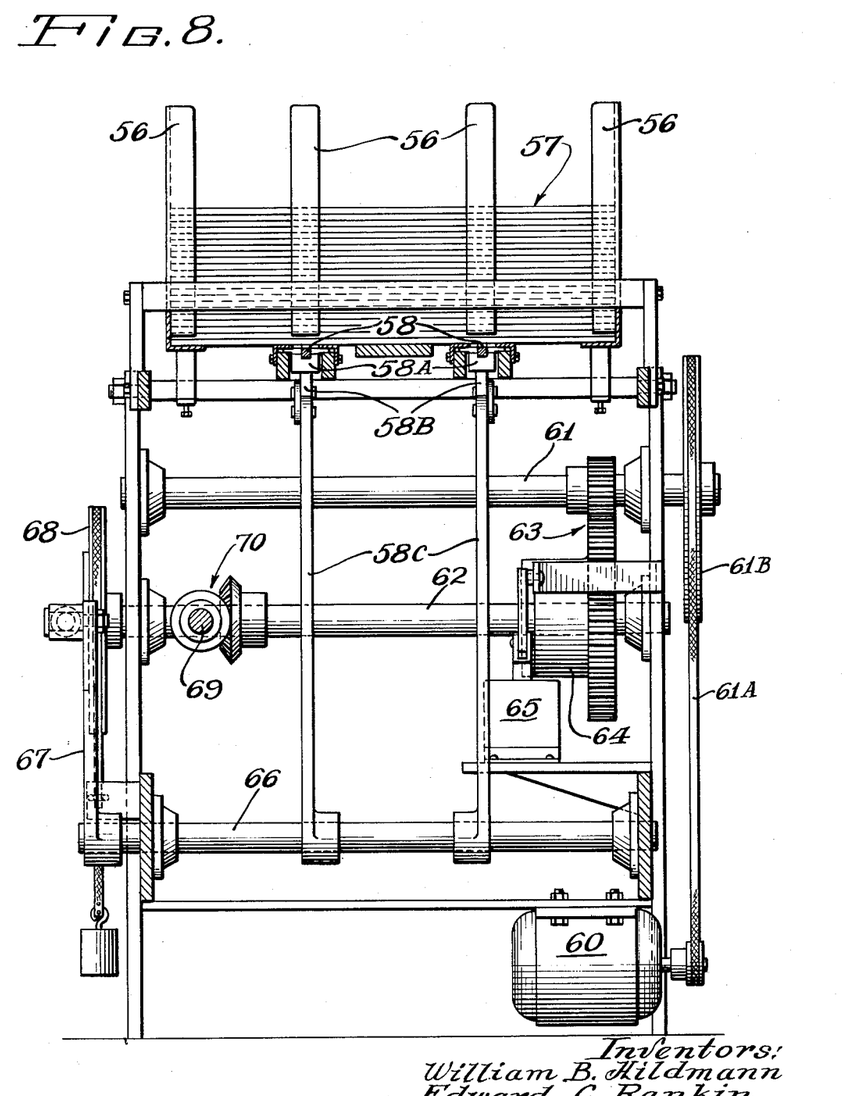
FIG. 8 is a transverse, vertical cross-section through the forming bed of the machine looking in the direction of lines 8—8 of FIG. 7.

As depicted in FIG. 8, the casings are withdrawn one-by-one from the bottom of the stack 57 by a pair of spring-biased pawls 58, each carried on a reciprocable block 58A slidable in the machine bed and reciprocated by mechanism including levers 58B, 58C (shown also in FIG. 7). The feeding or advancing action is unidirectional and intermittent or step-by-step, since the pawls 58 move the cases on the forward phase, but not the return phase of their reciprocatory cycle.

There are a plurality of sets of the feed pawls all connected in tandem and spaced apart along the bed of the machine at intervals corresponding to each forming or operating station, so that each forward movement (toward the left in FIGS. 7–7A) will cause any set of covers or casings at one station (including the hopper stock) to be advanced to the next station, progressively toward the discharge end of the machine as the feed pawls are jointly reciprocated.

Figure 7A:
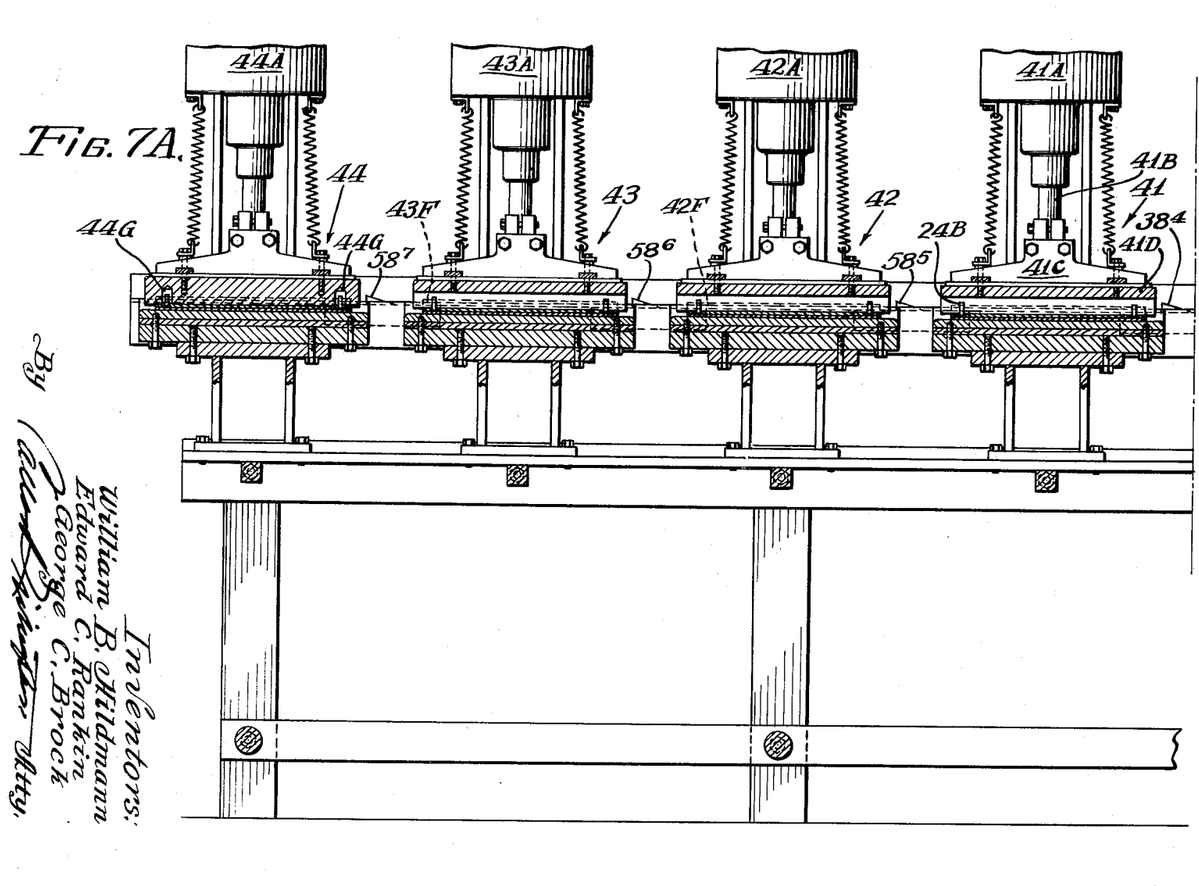

Thus in FIG. 7, feed pawls are shown at $58^1$, $58^2$, $58^3$, and so-on, to the last set of pawls $58^7$ appearing at the end of the bed in FIG. 7A.

The main power plant for the machine is shown in FIG. 8, and includes an electric motor 60 driving a shaft 61, which drives countershaft 62 through gears 63 and a one-cycle clutch 64 tripped by a solenoid 65.

Figure 7B:
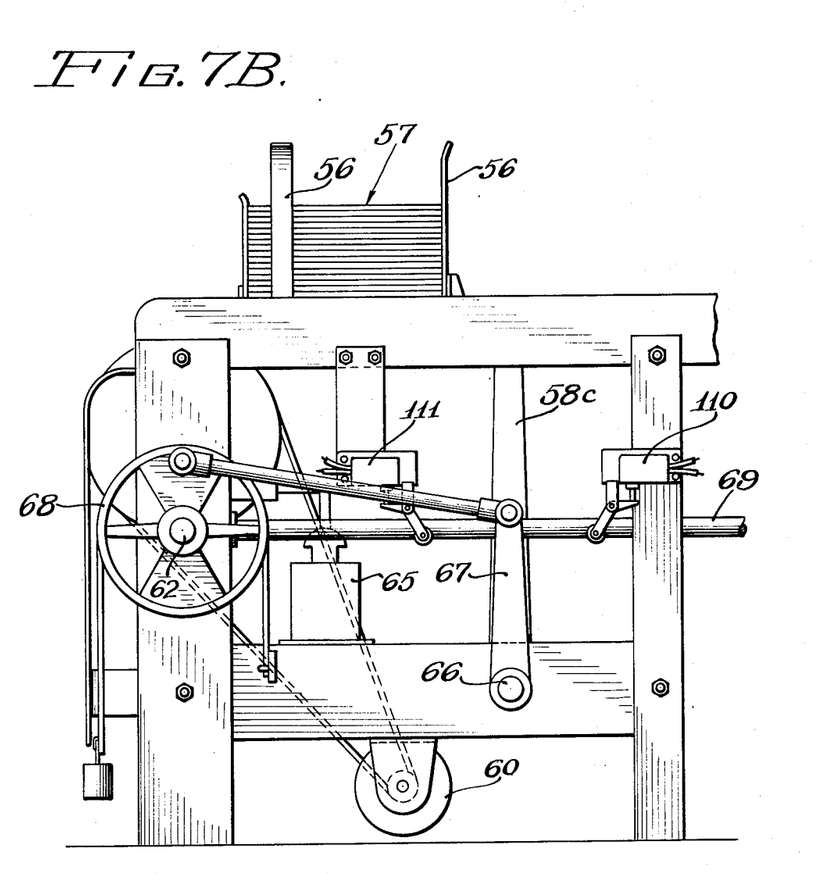
FIG. 7B is a partial side elevation of the infeed end of the machine looking at the side opposite from that of FIG. 7.

The rocker feed levers are oscillated on shaft 66 through a crank drive 67 to wheel 68 on countershaft 62 (FIGS. 7B and 8).

As viewed in FIG. 7, means for taking off power for the backbone strip infeed includes a countershaft 69 having a mitregear drive 70 with countershaft 62, from which a sprocket-chain drive 71 is extended to the strip conveyor-chain means 55 heretofore described (see also FIG. 6).

At this juncture it should be noted that both the backbone-strip infeed and casing infeed operate in synchronism on a one-cycle basis owing to the provision of the one-cycle, solenoid-released clutch means 64, 65, the counter-shaft drives being such that for each advance of a casing to the assembly station 55A (FIG. 6) the conveyor chains 55 will advance a determined amount to move one of the backbone strips 24 into position opposite the assembly panel or station 55A.

Automatic registering means for manually locating the backbone strips includes a pair of lateral registry arms 72 (FIG. 6) pivoted as at 73 on the bed and rocked up and down in step with the advances of the casings so as to be lowered upon a casing as it arrives and stops before an operator at the assembly station 55A. The rocking of the registry fingers is effected by means of a lever 74, pulled by spring 75 to bear down on the tacking die 40 to be rocked upwardly upon opening movement of this die.

The operator seizes (preferably by grasping the two rivets 24B) the strip and places it against the ends of the registering arms and down upon the outer backbone strip of the casing in the position of the strip 24X in FIG. 6, and also against a longitudinal registry stop 73 rockably attached at one end (not seen) to the machine bed so that its free registering end bears by its own weight upon the casings, passing therebeneath to the assembly station.

The condition of the manually placed and registered sister strip 24X, as thus positioned by the operator at the assembly station, is shown to larger scale in FIG. 9 to emphasize the function of the lateral and longitudinal registering means 72–73 in the initial locating of the sister strips on the outer backbone strip.

At this time the operator also places a liner cloth 26 (as in FIG. 10) on top of the registered sister strip 24X, these liner strips being previously punched to fit the rivets 24B so that the liner may be said to be registered by the rivets, these liners having been previously coated with a thermobonding adhesive prior to stacking onto the backbone strips to make up the complete assembly. However, liners are sometimes omitted, in which case the double-jointing of the hinge would likewise be eliminated.

As will appear more fully hereafter, the operator has full control of the cyclic operations of the machine, and is able to hold the casing-strip-and-liner assembly at the assembly station as long as necessary; and upon initiation of the next cycle the completed assembly will be passed into the tacking dies.

Figure 11:
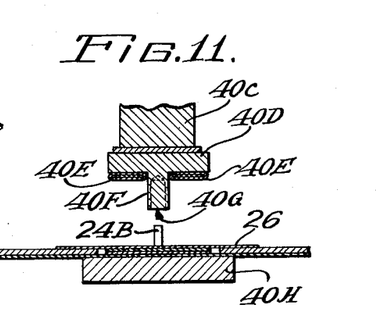
FIG. 11 is a fragmentary cross-sectional schematic view of the initial or tacking die, and the casing in position for tacking.

The construction of the tacking die 40, as depicted at the left of FIG. 7, includes a pneumatic actuating cylinder 40A, the piston rod 40B of which connects with a head block 40C, to which the tacking die 40D is attached. This die corresponds to the member 25 described in view of FIG. 3, and is of a T-shaped cross-section shown to advantage in FIG. 11. An electrical heater element 40E is located under the top of this die on either side of the die face 40F. Also, as seen in both FIGS. 7 and 11, the die face is provided with two holes 40G, into which the rivets 24B in the backbone of the casing project when the casing is at the tacking station. A backing plate 40H is secured in the bed beneath the tacking die, and it will be apparent from FIGS. 7 and 11 that pressure and heat will be applied by the narrow, elongated tacking die 40 only along a narrow median strip running lengthwise of the sister strip and liner cloth.

The remaining dies are four in number (as seen in FIG. 7A) and are termed for convenience forming dies, since they each consist of rounded male and female die sections for imparting the desired curvature to the composite backbone structure.

The forming dies 41 to 44 are nearly identical and they are respectively provided with pneumatic actuators 41A, 42A, 43A, 44A (FIG. 7A). Considering the die 41 as representative, the piston rod 41B connects to the head block 41C, to which the male die 41D is attached.

Figure 12:
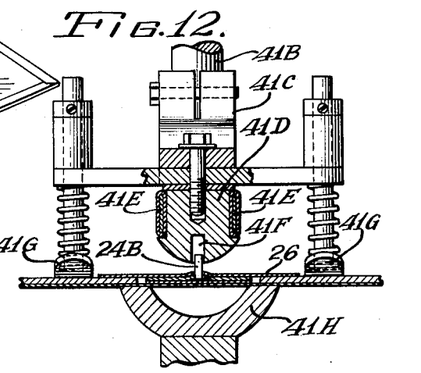
FIG. 12 is a fragmentary cross-sectional detail through the first forming die with a flat, initially-tacked casing in position for rounding.

The male die 41D is elongated and of a semi-cylindrical or convex curvature in cross-section (as shown in FIG. 12). Heater elements 41E are carried on opposite sides of the die proper, running lengthwise thereof; and in the center of the die face is a longitudinally-extensive slot 41F through which the rivets 24B pass in the advancing movements of the casings. These die slots constitute an important means for registering the casings relative to the die parts during forming and in the advances of the casings.

Each of the forming dies is provided with spring-presser feet attached thereto (such as shown at 41G in FIG. 12), which rise and descend with the die and serve to hold the casings, particularly the cover boards thereof, flat on the bed as a further means for assuring uniform movement of the backbones into the convex female die sections (such as indicated at 41H in FIG. 12).

Figure 13:
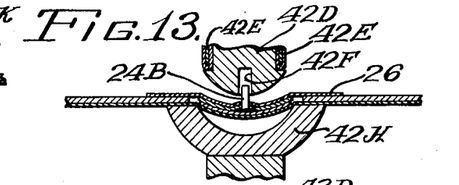
FIG. 13 is a fragmentary cross-sectional detail through the second rounding die showing the partial backbone curvature imparted by the preceding die.
Figure 14:
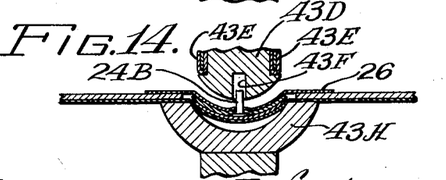
FIG. 14 is a fragmentary cross-sectional detail through the third rounding or forming die showing increased backbone curvature.
Figure 15:
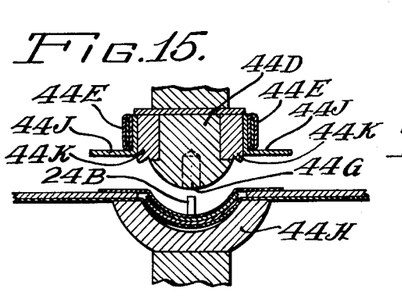
FIG. 15 is a fragmentary cross-sectional detail through the fourth rounding die showing the backbone curvature existing at the beginning of the last forming stage.

Dies 42 and 43 are substantially identical to die 41, except that their respective male or upper sections 42D and 43D are positioned at successively lower levels in order that the rivets 24B can register in their guide slots 42F, 43F, since the backbones take on an increasing curvature from station to station, and hence are at increasingly lower levels, as will appear in FIGS. 13 and 14.

The final forming die 44 differs somewhat from the preceding dies 43, 42, 41, in that it is also a jointing die and has an upper or male component 44D provided with two longitudinally spaced rivet-receiving holes 44G, instead of the longitudinal slot provided in the three antecedent dies.

The first rounding die 41H is only about half as deep as the remaining three dies, that is, it has a radius of curvature which is about half that of the succeeding three dies, so that the tacked strips will be gradually bent by an amount which will not disturb the tacking and cause slippage; by the time the initial curved pieces reach the second rounding die, the bond is sufficiently extensive to withstand full curvature in the last three dies.

Figure 16:
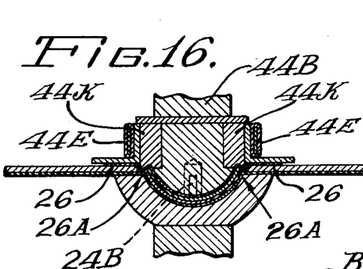
FIGURE 16 is a view similar to that of FIG. 15 but showing the dies closed to complete the rounding and form-up the joint.

Moreover, the final die has two flanking, longitudinally extensive ironing wings 44J in which the heating elements 44E are positioned, and which serve to iron out any remaining wrinkles in the liner cloth 26. Also flanking the length of the male die part 44D are two longitudinally-extensive jointing dies 44K which project down into the space between the juxtaposed hinge edges of the cover boards and backbone structure when the final die is closed (as in FIG. 16), forcing the liner cloth 26 ahead and into contact with the outside cover cloth to adhere to the latter, as at 26A.

The partial joinder of the strip elements (including the liner strip) by the tacking operation assures continued register of these parts for subsequent travel through the forming or rounding dies; moreover, and also of great importance, is the function of the tacking to maintain this registry while the several strip elements bend jointly into the cavities of the rounding dies, since the stacked or superposed relation of the several elements of the backbone structure otherwise tend to slip. Further maintainance of the registery of the assembly with respect to all of the dies, especially after tacking, is assured by engaging the rivets with registering means, such as the grooves and slots 40G, 41F, etc., in the movable or closable die parts.

Cooling Conveyor

When the casings or covers leave the last die unit 44 they are fully formed and are passed to a conveyor means (such as shown in FIG. 7B), which consists of an endless belt 80 provided with a series of flights 81 for engaging the edges of the casings to transport the latter from right to left in FIG. 7B.

Spaced along one side of the conveyor belt are backbone-engaging horizontal rollers 82 having felt rims to bear against the backbones of the traveling casings.

Spaced vertical hold-down rollers 83 exert a downward holding effect on the uppermost cover boards close to the joint.

Cooling means in the form of motor-driven blower units 84 spaced along the side of the conveyor hasten the cooling and final setting of the adhesive in the curved backbone structure.

The conveyor belt is driven at a moderate speed by means of an electric motor 85 driving a speed-reducing unit 86, which in turn drives the conveyor through belt means 87.

Figure 7C:
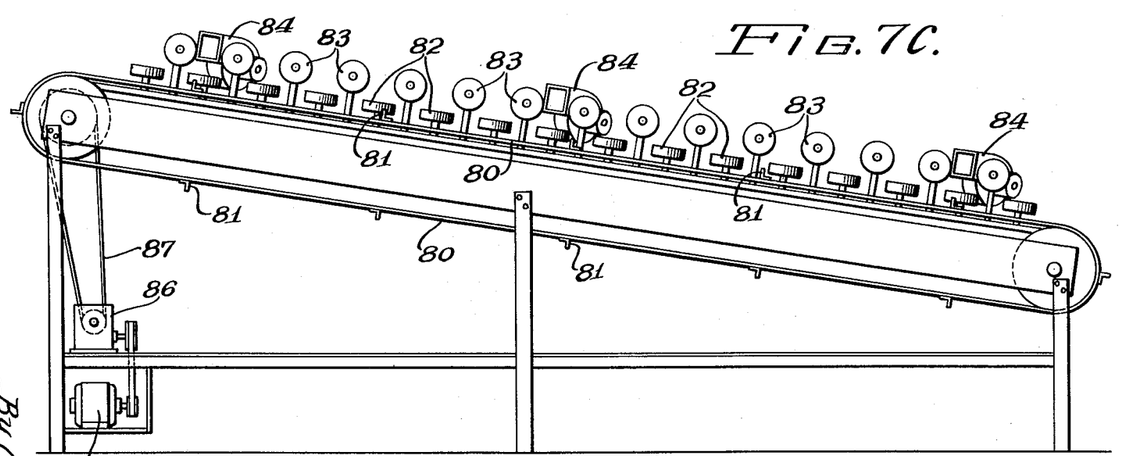
FIG. 7C is a side elevation of the cooling conveyor.
Figure 7D:
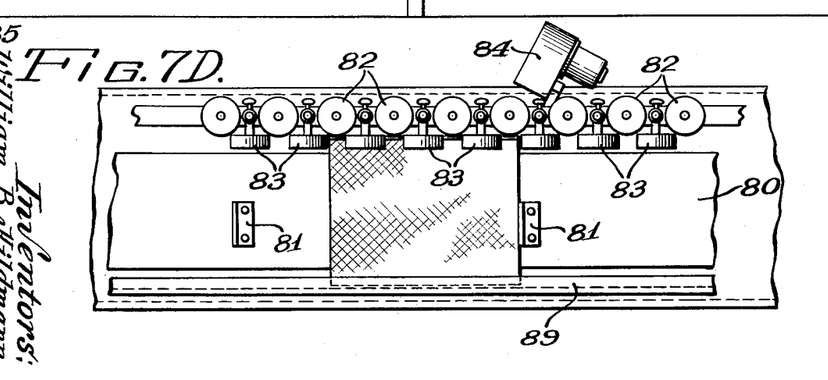
FIG. 7D is an enlarged, fragmentary top plan detail of the cooling conveyor and hold-down and backing roller means.

In FIG. 7D there is shown a completely die-formed casing 88 on conveyor belt 81 with the horizontal or back-up rollers 82 engaging the backbone and the hold-down or horizontal rollers 83 overlying the joint margins, while the opposite or free opening edges of the casing confront a longitudinally grooved guide rail 89 extending along the length of the conveyor on the side thereof opposite from the roller means 82–83.

The formed casings, upon leaving the last die, are inspected and manually closed before lodgement on the conveyor belt.

Control Circuit and Summary of Operation

Figure 17:
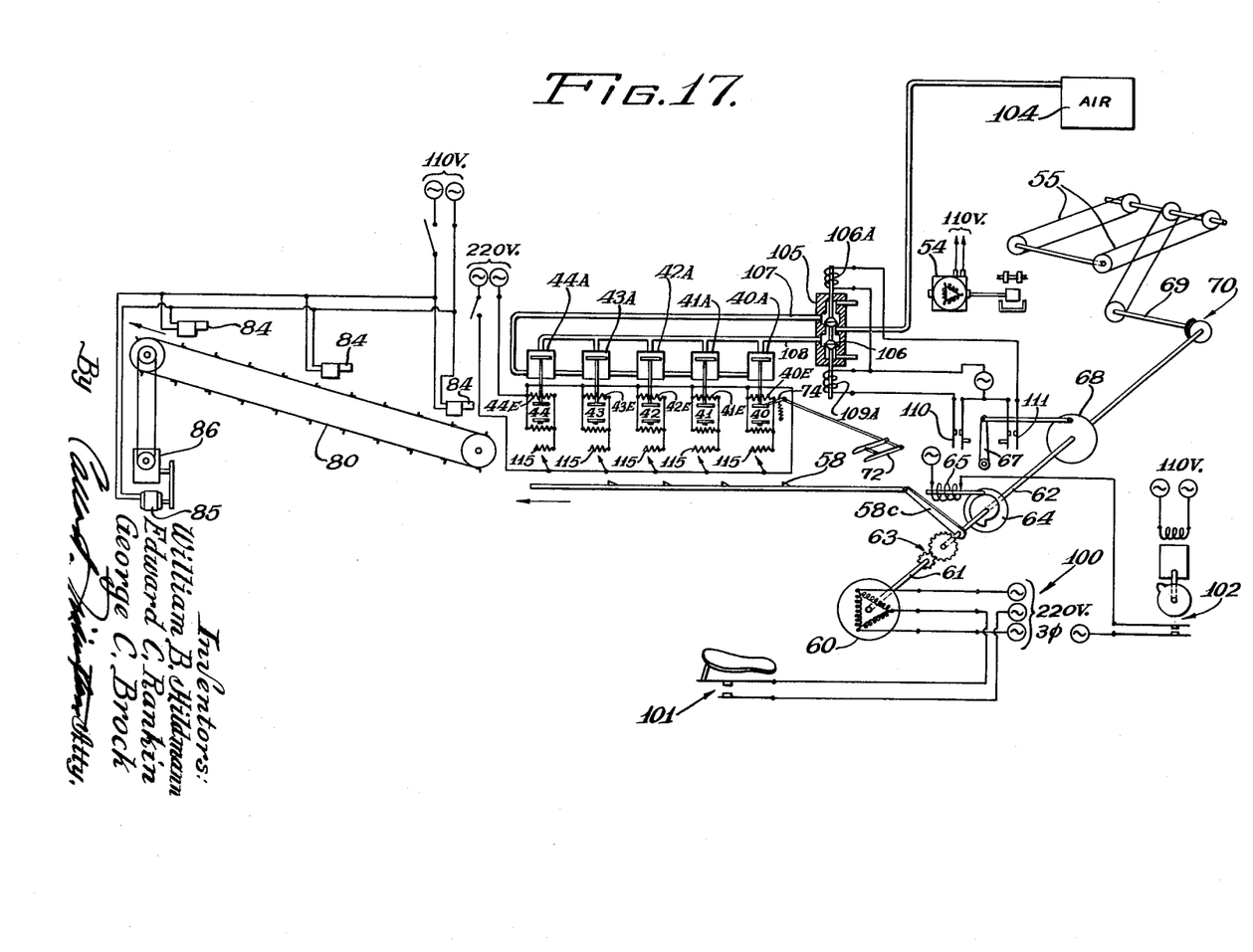
FIG. 17 is a schematic diagram of the electric and air control circuits for the forming machine of FIG. 6.

In the schematic illustration of FIG. 17 there are shown the several tacking and forming dies 40–44 with their respective pneumatic actuators 40A–44A and their heater elements 40E–44E.

The main driving motor 60 is connected to a three-phase power source 100 through a foot switch 101. So long as the operator holds this switch closed motor 60 will drive the shaft 61; but the machine will not be effectively operated unless the one-cycle clutch 64 is actuated.

Clutch means 64 is actuated intermittently by energization of solenoid 65 through the agency of a slow electric clock switch 102 connected to power to run continuously while the machine is in service.

However, it will be understood that if the operator does not close the foot switch 101, the intermittent operations of the clutch 64 will produce no result, since under this qualification the main motor 60 would not be running.

The cycling of the pneumatic die actuating means is controlled electrically, but dependently, upon the mechanical operations of the one-cycle clutch means.

Compressed air from a supply source 104 is delivered to an air valve 105 connecting through valve means 106 and common air line 107 to the opening side of all of the pistons for the pneumatic actuators 40A–44A. The closing side of these actuator pistons is also connected via common air line 108 through valve means 109 to the compressed air source 104.

The valves 106 and 109 are of a type which will remain in whatever open or closed position they are moved to by the two operating solenoids 106A or 109A.

It will be observed that whenever the feed lever 58C is moved (to the left) to advance the feed pawls 58 in a direction to transport the casings into the dies, the lever 67 which drives this feed lever from the clutch countershaft 62 is likewise disposed in a corresponding position of advance toward the left, and will close a switch 110 to energize the valve solenoid 109A to admit air pressure to line 108 and thereby close all of the dies 40–44. Thus, the dies cannot be closed upon the casings until the feed pawls 58 have completed their advancing stroke and stop.

Upon completion of any operating cycle of the one-cycle clutch means 64–65, the feed drive lever 67 is disposed (FIG. 17) at the left-hand terminus of its stroke with die-control switch 110 closed to initiate closure of the dies, as aforesaid; and this condition will persist until such time as the clock switch is next pulsed to actuate the clutch, whereupon feed drive lever 67 will move back toward its right-hand terminus (FIG. 17) and stop, at which time the right or opening die-control switch 111 will be operated to energize the valve solenoid 106A, reversing the applied air pressure to line 107 to open all dies, the latter remaining open while the feed drive lever 67 reverses and again moves back toward the left terminus whilst advancing all casings one station (and also feeding the next succeeding casing into the sequence), thus completing its cycle and again closing the dies.

Each operating cycle of the countershaft 62 also effects, through gears 70, an advance of the backbone conveyor chains 55 to deliver another adhesive-coated backbone strip to the assembly table or station, as at 55A, FIG. 6.

Since the operator has complete control of the driving power for the machine through the agency of foot switch 101, the cycling is inherently automatic and independent of the operator's actions because the clock switch runs continuously and is not affected by the foot switch, the crosswise delivery of the coated backbone strips to the assembly table 55A is synchronous with the advance and arrest of the casings to and past the operator thereat, and full opportunity is afforded (by a predetermined appropriate timing of the clock switch) for proper and careful manual placement of the backbone strips and liners upon the registered casings before the latter resume advance toward the dies.

In practice, the overall operational timing is such that the operator can hold the foot switch 101 closed for long periods and complete the continuous assembly of backbone strips one after another without interrupting the flow of casings.

Moreover, the cycle may be interrupted at any point by lifting of the operator's foot from the foot switch 101, and the interrupted cycle will be resumed and accurately completed by a subsequent reclosing of the foot switch, should occasion require.

Thus, the time necessary for the assembly operation by placement of the sister backbone strips and liner cloths upon the casing blanks, as well as the movement of the assemblies relative to the progressive die means 40–44, is absolutely under control of the operator at all times.

As the casings, with fully assembled and rounded backbones, emerge from the last forming die 44, they are transferred onto the cooling conveyor belt 80 and passed through the air currents from the spaced blower means 84, whilst being held to shape by the roller means 82, 83 (FIGS. 7C–7D, also), so that no substantial loss of curvature is permitted during the cooling of the thermobonding adhesive. In practice, the temperature of the several heater elements 40E–44E is adjustable by inclusion of a rheostat control 115 in the energizing circuit for each of the said heater elements.

The machine described above is satisfactorily operated with temperatures of about 275° F. on the upper dies, and about 150° F. on the lower dies, where the interfacial or included adhesive is of the polyvinyl acetate variety heretofore mentioned.

The preferred pressure on the dies is about 60 lb./in.$^2$, and the transit time for travel through the five die stations shown (thus excluding infeed and outfeed time) is preferably set at the rate of between 7 to 10 cases per minute, so that each casing is held in each die for about 5 seconds at the temperature and pressure mentioned.

However, the temperatures and pressures may be varied somewhat, as for example where embossed or imitation leather coverings are used; in such cases the temperature of the bottom dies may be reduced to about 120° F. and the pressure dropped to about 40 lb./in.$^2$ in order not to iron out the embossing or the artificial grain in the imitation leather, since these materials generally contain castor oil or the like, which could be driven out at higher temperatures.

An adhesive which is found highly suited to use in the practice of the new method and in the machine process is commercially available under the proprietary trademark "Arabol #67," and is a polyvinyl acetate type which bonds rather quickly under conditions such as specified and sets up fairly hard when cool.

The adhesive agent is a polyvinyl acetate with about 40% solid to 60% water, and while other similar thermo-bonding or heat-worked adhesives are commercially available and can be used in the described process and machine, very satisfactory results are obtained with the preferred type specified.

In the current usage of the trade, an adhesive consisting of polyvinyl acetate in a water vehicle, such as specified herein, is classed as a "thermoplastic" adhesive. However, most "thermoplastics" are supposed, by implication at least, to soften on reheating and therefore to relax or relieve any bond on reheating. Such concepts tend to exclude the possibility of any setting or bonding of an adhesive such as described in the presence of heat; or the maintenance of the bond in cases of reheating after a bond has once been effected by initial heat treatment.

It is the character of the adhesive preferred for use herein, and described as polyvinyl acetate dispersed in a water vehicle, that it tends to bond at once to the paperboard, cloth, or like surface, or to another surface coated with the same substance progressively as the water vehicle is expelled or withdrawn, whether by heat, pressure, evaporation, or a combination of these factors. Accordingly, the described adhesive begins, or has a tendency, to bond in the process from the instant heat is applied at the tacking and other dies, at the rather elevated temperatures specified; and this tendency is augmented by the further effects of applied pressure, so that bonding begins at once on closing of the dies. For this reason, the tacking operation is wholly effective to secure the sister strips permanently in register even though the set of covers on leaving the first station may still be very nearly as hot as the dies. Moreover, the tacked adhesive will maintain its bond in the presence of the fully applied high temperatures encountered at the succeeding forming stations, so that any bonding achieved at a preceding station is not relaxed in any significant sense at any succeeding station.

It is also a characteristic of the described adhesive that sustained reheating of the fully processed covers, even at temperatures high enough (e.g. 300° F.) to scorch the cover cloth severely, will not cause this adhesive to let go nor even permit the backbone curvature to relax by any practically detectable amount.

In view of the foregoing character of the described adhesive, the term thermo-bonding has been adopted in substitution for the expression "thermoplastic" notwithstanding that "Arabol #67" and like polyvinyl acetate formulations are generally sold in the trade as "thermoplastic" adhesives.

However, some commercially available polyvinyl-acetate base adhesives will be found to contain additives in the nature of plasticizers, fillers, etc. or may include co-polymers, or have molecular structures and weights affecting the softening and heat-seal temperatures thereof to the extent that they will not prove suitable for use in the disclosed process and apparatus, particularly in the respect that they may not provide a set or bond sufficient to retain the desired curvature of the backbone structure throughout the high-temperature multi-stage forming process specified, or especially after leaving the last die station in heated condition.

In general, for the purposes of the disclosed process, apparatus, and backbone structure, a thermoplastic adhesive in the form of a water dispersion of polyvinyl acetate which is a homopolymer having a molecular weight in the higher ranges attaining to about 500,000 and having a melt-seal temperature range between approximately 250° and 260°F. for the film or coating, will perform satisfactorily and provide a reliable tack of the sister strips at the first station with satisfactory maintainance of curvature throughout the succeeding forming dies without substantial reduction of temperature or cooling, and afford good retention of form even in the hot condition of the structure after leaving the last die station. The emulsion may contain from 40 to as high as 55 percent solids.

In general, thermosetting types of adhesive are less suited to the disclosed process and apparatus of numbers of reasons including short pot life because of the irreversible chemical action involved and the possibility for accelerated or erratic setting action in any phase of the multistage heating and forming treatment specified, even when accompanied by rigid and therefore more costly operational controls.

The use of hydrid or mixed types of adhesive which are usually designated as "thermosetting" by reason of irreversible chemical action involved in the use of a cross-linking type of thermosetting resin in combination with some compatible polyvinyl acetate resin in liquid phase, may alleviate in some measure the critical behavior of a true thermoset, but pot life and operational controls continue in render the adhesives of the "thermosetting" class so far available too critical and much less desirable for use in a high-volume production process and high-speed forming machine such as described than a thermoplastic or thermobonding adhesive of the type specified.

It is to be understood that the aforesaid working temperatures and bonding or melt-seal or heat-seal performance specified for Arabol #67 or other suitable adhesive having the working temperatures and high molecular weight suited for use in the described process and machine, are referred to the adhesive or bonding agent, i.e. polyvinyl acetate, in the condition of a thin coating or film, with included moisture, such as would result from a coating operation performed by the adhesive-applying mechanism 50, 51, 52, 53, etc., described in view of FIG. 5.

There is evidence to support a theory that the success of the process is in some part due to the action of the applied heat both upon the solid constituent and the water content of this adhesive, in that much of the water appears to be driven into the backbone strips and to assist in conditioning the fibrous material for bending while hastening the formation of the acetate bonding film.

In the absence of suitable heat, the resulting product has not the required curvature and no rigidity, unless held in the dies an impractically long time, notwithstanding the fact that the same adhesive will start to set in a short time if left uncovered in open air at room temperature.

The method may be practiced by hand operation using a single forming die and applying heat at the above temperature ranges with the same adhesive and sufficient pressure to bend the backbone strips. In such cases, however, the forming time must be held to not much less than one minute for best results to procure full setting of the adhesive.

One of the important processing advantages of the present method, apart from the fact that a superior backbone is provided, is the fact that the backbone structure is formed-up in situ in the flat, covered casing blank; whereas, according to prior practices, rigid, curved backbones had to be made separately and thereafter incorporated in the case, and various hand-operations rendered production costly and slow.

Moreover, since it is desirable for mass production of a low-priced type of case to employ binder's board for both the covers and the outer backbone strips, a very rugged backbone can be made according to the present disclosures by combining the soft board with a harder secondary or sister backbone strip; yet, by reason of the thorough and relatively rapid setting of the adhesive, the desired curvature is maintained without precurving or manufacture of the curved backbone separately from the casing. Thus, standard, machine-made "rough" or blank casings of binder's board may be used in a rapid machine process, capable of delivering 300 to 400 cases an hour, the only change required for use of such manufactured casings being the employment of a half-thickness board stock for the main outer backbone strip.

The tacking operation is an important step in the process where the progressive die-forming operations are employed; because, notwithstanding that the rivets (where that construction is being made) tend to assist the holding of the liner cloth in register, there is nothing to maintain the sister strips in register during movement from station to station, or during their bending into the dies; and the tacking, securing both the liner cloth and the sister strips in register as it does, prevents slippage of these parts in all stages thereafter.

The cooling means, including the conveyor with hold-down rollers and blower means, assures a controlled uniformity of end product; and, while the adhesive is substantially set or bonded after the cases leave the last forming station they are still quite hot and generally have to be subjected to further manufacturing operations for such purposes as installing binder mechanisms (not shown) for which the rivets are provided, or for attaching inside end papers or labels, etc., all of which involve some kind of handling and further applications of force of one kind or another with attendant danger of altering the backbone curvature before the temperature has been brought down. The continued outfeed travel from the last die through the hold-down bed obviates such hazards, and also makes possible some speed-up of the forming or rounding time, since the cases would otherwise have to be subjected to heat and pressure in the dies for a somewhat longer time to assure uniformly complete setting.

We claim:

1. A process for the manufacture of book casings with backbones rounded in situ, which comprises use of casing blanks having a flat backbone member hingedly joined to flanking cover members, and placing a second backbone member in registered assembly upon the first backbone member of each casing, providing between said assembled backbone members a layer of thermobonding adhesive at least coextensive with the extent of the meeting plane between said members, moving said casings step-by-step along a predetermined path into and out of a predetermined number of stations, at the first of which is a flat backing surface underlying the backbone assembly of a casing disposed thereat, there being a rounding cavity disposed to underlie the backbone portions of casings disposed at succeeding stations; applying a bonding heat and pressure to a restricted area of the backbone assembly of casings disposed on the flat backing surface at the first station, and applying setting heat and rounding pressure to the major portions of the backbone assembly of casings at succeeding stations, this pressure being directed against the backbone assembly to force the latter in the respective rounding cavities at the several subsequent stations, holding each casing under pressure and heat, as aforesaid, at said subsequent stations for a predetermined short time interval sufficient to impart at least a partial setting to said adhesive and advancing said casings in close succession into and out of a number of said stations such that the cumulative time duration of exposure to heat and rounding pressure, as aforesaid, will be sufficient to substantially complete the setting of said adhesive, whereby to fixedly hold said backbone assembly in a predetermined rounded condition.

2. A book casing with simulated headbanding and a rounded backbone structure, comprising a pair of covers of identical predetermined thickness hingedly joined by an adhesively attached, pliable outside cover material to a first backbone strip of approximately half said thickness, said material being turned over the endwise head edges of said first strip; a second backbone strip of approximately the same thickness as said first strip and having its endwise head edges covered over by a material adhesively secured thereto and matching in appearance said cover material, said second strip being superimposed upon the inside face of said first strip, said strips being conformed to a predetermined concavo-convex curvature and held in said conformed shape by means of a set thermobonding adhesive engaged with the interfaces thereof.

3. A book casing, especially for rivet-attached binders, said casing comprising: a pair of cover boards both of a certain predetermined thickness joined by flexible hinge means to a first backbone strip of approximately half said thickness; a second backbone strip of the same half-thickness as said first strip and of the same over-all size as the latter, said second strip being superimposed upon said first strip and having formed therein a pierced embossment for a headed rivet; headed rivet means projected through said pierced embossment with the headed portion thereof disposed between said strips in the embossment; said strips being conformed into a concavo-convex curvature crosswise of their length and rigidly conformed by a heat-worked adhesive.

4. In a machine for joining and rounding laminar backbone elements by means of a thermobonding adhesive disposed between the interfaces of the elements, the combination of: a plurality of pairs of elongated complementary concavo-convex rounding dies open at their respective ends and arranged seriatim in an end to end series, and means for heating the same; one of said dies in each pair being movable into and out of closed forming relation to the other for seizure and release of an assembly of said backbone elements; a tacking die at one beginning end of said series including a flat, elongated bed portion and a complementary die portion having a die face of flat, narrow, elongated form, the over-all area of which is substantially less than the over-all surface area of one face of one of said backbone elements; means for heating at least the die face of the tacking die; at least one of said complementary bed or die portions of the tacking die being movable into and out of closed tacking relation to the other for engagement and release of an assembly of said backbone elements to partially join the same together by initiating a bonding of part, but not all, of the adhesive between the respective elements, said narrow die face being positioned to engage a median region of said assembly along the length thereof; and intermittently operable feed means for moving said assemblies sequentially from a starting position into forming positions first into said tacking die and next endwise out of the tacking die and endwise successively into said rounding dies and finally out of the latter; and means for moving said movable die portions to close and open said dies in predetermined timed relation to the intermittent operations of said feed means at times when the assemblies are at rest.

5. The combination of claim 4 further characterized by the provision of timing means cooperable with said feed means for determining a certain time interval between the intermittent operations of said feed means whereby the duration of rest of an assembly in each of said rounding and tacking dies is predetermined.

6. In a machine for rounding and joining assemblies of superimposed, registered, elongated strip material by means of a thermobonding adhesive situated between the strip portions to be joined; a heated tacking die having a die face of substantially lesser area crosswise than the superficial area of any of the superimposed strips and adapted to effect a partial bonding action of said adhesive only in a limited interfacial area in a centrally elongated and crosswise narrow lane of the strips to tack the same against slippage from registered condition in transport and crosswise bending thereof; and rounding die means situated adjacent the tacking die for bending said assemblies to a desired curvature; heating means associated with said rounding die means for transferring heat energy into the entire strip assembly to effect a total bonding action of said adhesive throughout the total interfacial areas of the strips to be joined; together with mechanism operative intermittently for moving said assemblies sequentially into predetermined positions for engagement first by said tacking die and thereafter by said rounding die means successively; and means cooperable in timed relation with said moving mechanism for moving said tacking die and rounding die means into and out of operative engagement with assemblies respectively situated in the said predetermined positions.

7. In a machine for making rounded laminar backbones by joinder of assembled flat backbone-strip members in a flat casing blank with a thermobonding adhesive: means for feeding casing blanks each having a flat backbone strip member flanked by a pair of flat covers serially along a bed, intermittently, into and out of succeeding forming stations, said casing strip members having registered thereupon a sister strip with a thermobonding adhesive therebetween; movable elongated tacking-die means at a first station and having a longitudinally centralized and laterally-narrow die face; movable rounding-die means at a plurality of succeeding stations and having laterally-curved die faces of greater area laterally than said tacking die; means for moving said die means respectively into and out of tacking and forming engagement with assembled strip members at the respective stations; means for heating said dies to effect thermobonding action of said adhesive in zones corresponding to the die-face areas thereof; separate drive means for respectively actuating said feeding means and said die-moving means; and control means for said drive means and including cycling and timing instrumentalities acting to synchronize the operation of the feeding means and die-moving means as aforesaid in timed coordination, such that the respective die means engage and disengage the backbone members positioned thereat only at times when said members are in a condition of rest with regard to the die means and feeding means.

8. In a machine for rounding backbone structures in book casings: a series of rounding dies adapted to be opened and closed upon the backbone portions of a casing positioned relative thereto; means operable to open and close said dies; means for feeding casings seriatim to position the backbone portions thereof relative to said dies sequentially; conveyor means for feeding backbone strips seriatim crosswise of the travel of said casings to a delivery station disposed in advance of the first of said dies; drive mechanism actuating said casing-feeding and strip-feeding means in a predetermined timed coordination such that casings advanced by the feeding means therefore will be arrested substantially opposite said delivery station at a time when said strip-feeding means is at rest whereby an operative may transfer a strip, disposed by said strip-feeding means at said station, onto a casing arrested at said station; control means adapted to be actuated by said operative and controlling the operations of both of the feeding means aforesaid; together with means operating under control of said control means for closing and opening said die means in unison and in a predetermined synchronism with said casing-feeding means such that fed casings are in a condition of rest relative to any of the die means at times when said die means are opened or closed as aforesaid.

9. In a forming machine having closable dies with selectively-operable, electrically-controlled die-closing and opening means, and a cyclically-operating step-by-step feed means for advancing objects to said dies, one step per cycle; the subcombination of interdependent control means for the die control and feed means comprising: a motor; an operator's switch for starting and stopping the motor; an electrically-controlled, one-cycle clutch for connecting said motor to drive said feed means for one complete advancing cycle per clutch cycle; an intermittently operable switch for operating said clutch at predetermined intervals to initiate cycled operations thereof; switch means for actuating said selectively operable means to close said dies following each completion of each advancing operation of the feed means in any feeding cycle; switch means operable by said feed means to actuate said selectively operable means to open said dies at a time following each advancing action of the feed means and prior to the commencement of the feeding action thereof in the next succeeding feeding cycle.

10. In a case forming machine, the subcombination of closable forming dies, pneumatic means for closing and opening said dies, selectively operable valve means for controlling air to effect closing or opening of said dies; electrical means operable for effecting die-closing operation of said valve means; electrical means operable for effecting die-opening operation of said valve means; a reciprocable case feeding means for advancing cases step-by-step unidirectionally, relative to said dies; control switch means actuated by said feeding means at the termination of the case-advancing phase of the reciprocatory operation thereof to operate said electrical valve-operating means for causing closure of said dies; control switch means actuated by said feeding means at the termination of the reciprocatory operation of the feeding means attending each advancing operation thereof to operate said electrical valve operating means to cause opening of said dies; an electric motor; an electrically operated one-cycle clutch for connecting said motor to said feed means and producing one complete reciprocatory operation of the latter per clutch cycle; an operator-controlled switch for starting and stopping said motor; and a clocking switch for operating said clutch at predetermined intervals independently of the operation of said motor.

11. In a machine for rounding and joining flat backbone and liner strips in registered assembly with the flat backbone strip of a casing blank by means of a thermobonding adhesive contained between the interfaces of the strip portions to be joined, the combination of: a feed bed for said blanks; feed means for unidirectionally advancing said blanks from one station to another along said bed; stationary die means at each said station to underlie the backbone portion of a casing advanced thereto; movable die means overlying said bed at each station and cooperable with the corresponding stationary die means at such stations; the die means at a first one of said stations constituting a tacking die means and having die faces adapted to engage substantially less than the entire outside superficial area of the backbone assembly of a blank at the corresponding station, the die means at succeeding stations after the first constituting rounding dies in each of which the stationary part affords a cavity and the movable part affords a complementary convexity to depress substantially the entirety of a backbone assembly therein; means for feeding blanks on said bed into said first and succeeding stations one after another, selectively operable actuating means for closing or opening said movable die means in unison relative to their corresponding stationary die means and any backbone assemblies at the corresponding stations; means for heating all of said die means; and control means cooperable with said selectively operable actuating means and said feeding means for effecting cyclic operations of said last-mentioned actuating and feeding means in a predetermined synchronism in which the closing of said die means occurs only following completion of an advancing operation of the feeding means, and the opening of said die means occurs only at the conclusion of a cyclic of each of said cyclic operations.

12. The combination of claim 11 further characterized in that there is additionally provided an assembly station in advance of said first station, and a conveyor means for transporting backbone strips to a position adjacent said assembly station, and said conveyor means is driven in synchronism with said feeding means so as to be at rest concurrently with said feeding means, whereby to dispose conveyed strips in a condition of rest for transfer into assembly with a casing blank which is simultaneously at rest at the assembly station.

13. In a machine of the class described, a feed bed, a hopper adjacent said bed for flat-open back cases each including a pair of covers hingedly flanking a backbone strip; an assembly station along said bed near said hopper; a plurality of closable rounding dies disposed along said bed following said assembly station; a closable tacking die between the first of the rounding dies and the assembly station; means for heating all dies; reciprocable feed means for unidirectionally advancing casings step-by-step in flat condition along said bed from said hopper to said assembly station and thence to each die, one after the other, the casings moving one station for each reciprocation of said feed means; sister-strip registering means at said assembly station and movable into and out of registering position relative to the backbone strip of a casing fed to the assembly station; means for opening and means for closing said dies; means including an operating member cooperable with said tacking die in the opening and closing movements thereof for moving said registering means into registering position as the tacking die closes and for moving the registering means out of registering position when the tacking die opens, said registering means being adapted to guide the placement of a sister strip on the casing strip; said strips being adapted to have a thermobonding adhesive included therebetween; a power shaft and a driving motor therefor started and stopped by an operator's switch; a one-cycle clutch operable to interconnect said shaft with said feed means to effect one feeding reciprocation of the latter per clutch cycle; control means operated by said feed means at the conclusion of the feeding stroke thereof in each said cycle to actuate said die-closing means; control means operated by said feed means at the completion of the reciprocal phase of said feeding stroke in each said cycle to actuate said die-opening means.

14. In a backbone-forming machine for joining and rounding assembled, flat backbone strips of book cases by means of a heat-sensitive adhesive having rapid bonding action in the presence of a predetermined amount of heat, said adhesive contained between the interfaces thereof, one of said strips having projecting rivets spaced lengthwise thereof, the combination comprising: a feed bed for said cases and their assembled strips; die means including heated rounding dies in complementary pairs at sequentially spaced stations along said bed, one die of each pair being positioned to be engaged by the underside of a backbone assembly at the corresponding station, and the complementary die of each such pair being movable into forming engagement with the opposite side of said backbone assembly thereat; that one of the dies each pair of which engages the side of a backbone assembly from which said rivets project being provided with slot means to receive said rivets; feed mechanism for advancing cases serially step-by-step into and from the first to the last of said stations; die-actuating means for closing and opening said movable dies relative to their complementary dies; means for cycling and coordinating the operation of said die-actuating means with the operation of said feeding means to effect closure of the die means at times following the conclusion of each feeding operation with an opening of said die at the conclusion of the operating cycle; and timing means cooperable with said cycling and coordinating means for determining the duration of each said cycle and thereby the time interval during which said cases rest at each station.

15. The combination of claim 14 in which said slot means in the dies at the first and certain succeeding stations are open-ended and elongated in the direction of advance of the cases to provide a guide means for the rivets whereby to hold the cases in alignment in entering and departing from the appertaining station.

16. In a machine for forming rounded backbone structures in situ in flat casings consisting of a first backbone strip joined in covers, the combination including: means providing a feed bed with an assembly station at which additional strip members, including at least one further backbone strip, are super-imposed upon the casing strip with an adhesive between the super-imposed layers to provide each casing with a backbone assembly; means for moving cases with their assemblies from said assembly station into and out of a plurality of succeeding stations, one after another, along said bed; a rounding die at each of said succeeding stations, each die including at least one movable die member disposed to engage one side of a backbone assembly thereat, and a complementary die member disposed to engage the opposite side of the backbone assembly; spring-urged pressers on opposite sides of the movable die members and positioned respectively to engage the cover portions of the casings close to the backbone joint to hold the casings flat on the bed as the movable die part approaches the backbone assembly; power means selectively operable to actuate said movable die parts to move the same into and out of rounding engagement with backbone assemblies positioned as aforesaid at corresponding stations; and control means including a power-driven shaft, a cycling clutch operable to connect said shaft to drive said feed means through one feeding cycle, and control apparatus actuated cooperatively with said feeding means to actuate said selectively operable power means twice per operating cycle to move said movable die parts into and out of forming engagement with backbone assemblies, as aforesaid, in timed relation to feeding movements of said casings such that the latter are at rest at the respective stations before said movable die parts engage or disengage said assemblies in each said cycle.

17. In a backbone forming machine for flat book casings having flat backbones, a feed bed adapted to support said casings in open flat condition, a series of closable rounding dies spaced apart along said bed, each said die including a rounding cavity part in the bed and a complementary movable convex rounding die part above the corresponding cavity parts; means for advancing casings serially step-by-step along said bed to position casings successively between said complementary die parts, one after another; electric heater means on said complementary die parts of each of the dies of the series; spring-loaded hold-down means on each of said movable die parts and said means including a pair of flat hold-down irons flanking the convex die parts in positions each to engage one of the opposite cover parts adjoining the appertaining backbone so as to hold a casing down yieldably on the bed as the convex die part engages the backbone part of the casing to force the same into the corresponding cavity; operator-controlled cycling means for actuating said advancing means in cycles in each of which said casings are advanced from one die to the next of the series; and pneumatic means and selectively-operable valve means therefor actuated cooperatively with said cyling means for closing and opening said dies in unison at times following completion of the casing-advancing phase of said cycle and prior to initiation of the next succeeding advancing cycle.

18. A tacking die for partially joining elongated strip members of predetermined width and length loosely assembled in a stack with a backbone strip of similar dimensions, said strips having a thermobonding adhesive included between the interfaces to be joined, said tacking die including a flat, elongated bed part on which said assembly is positioned, and further including a movable part having an elongated, flat tacking face of narrow width substantially less than the width of said stack, and of a length approximating that of said stack; electrical heating means carried close to said tacking face; and selectively-operable power means for moving said movable die part toward and away from said bed part to forcibly press said tacking face against a side of said stack on said bed part and effect a joinder of said strips by at least partial bonding of portions of the adhesive which underlie said tacking face, and to withdraw said die face from the stack after tacking.

19. In a machine for forming backbone structures having projecting rivets, a forming die having rivet-receiving recesses therein, a feed bed for delivery of said backbone structures into operative position relative to said die with said rivets in position to enter said recesses; and feed means for moving said backbone structures one after another along said bed, step-by-step, and acting in each step to position an advanced backbone structure with said rivets in alignment to enter said recesses.

20. In a rounding die for forming flat elongated backbone structures having rivet means projecting therethrough, a movable die part including an elongated convex die face, and a stationary die part including a complementary cavity into which said backbone structures are adapted to be depressed and rounded by said movable part with said rivet means projecting in the direction of said movable part; said movable part having an elongated groove running the length of said convex die face and opening into the opposite ends thereof, said groove being of a depth and width to freely clear said projecting parts of the rivet means when said movable and stationary die parts are closed upon said backbone structure, and also to permit guided longitudinal travel of said backbone structure lengthwise of said movable part when the latter is moved to a predetermined open position relative to said stationary part, with said rivet means travelling in said groove to guide the travel of the backbone structure along a predetermined path.

21. In a machine for rounding backbone assemblies with projecting rivets, pairs of complementary, elongated convex and concave dies arranged in series, means for opening and closing said dies, means for advancing said assemblies from one die to the next in the direction of the length of the dies and backbones; certain of said dies having elongated rivet-receiving and guiding slots opening into each of the ends of those die parts which confront said rivets, to accommodate said rivets and guide the backbone assemblies along a predetermined path in advancing motion.

22. In a machine for forming backbone assemblies which include a backbone strip having at least one rivet projecting from one side thereof, and which are to be coated with an adhesive, coating means including: driven, companion feed-roller means adapted to engage opposite sides of the rivet-bearing strip to travel the same its length therebetween; that portion of the roller means which engages the particular side of the strip from which the rivet projects having a circumferential groove of a depth and width to freely receive and pass said rivet; means for supporting a supply of adhesive in contact with a companion roller means to be collected by the latter and applied thereto the surface of said strip opposite said particular side; and means for rotating said roller means in strip-travelling and coating action.

23. In a machine for forming backbone structures from an assembly of backbone strip elements having a thermobonding adhesive contained between their interfaces, the combination which includes: a tacking die, a rounding die, and feed means for positioning said strip assemblies sequentially in operative relation to said dies in the order named; a strip registering means including a guide member positioned along the path of feeding movement of said assemblies toward said tacking die, said guide member being adapted to move up and down into and out of operative position at one side of the backbone assemblies disposed thereat to define a guide for the positioning of certain of said strip elements in assembly with certain other of said strip elements, said tacking die including a part movable up and down in timed relation to the feeding operations of said feed means; mechanism cooperating with said up and down moving part of the tacking die for moving said register guide member up and down in step therewith, said timed relation between the tacking-die and feeding operations being such that no feeding movement occurs at least during the opening movement of said tacking die.

24. The process of making book casings with backbones rounded in situ, which comprises placing at least one elongated flat sister backbone strip upon a flat casing blank having a similarly elongated flat backbone, providing a layer of quick-acting thermobonding adhesive between said backbone strips, applying a narrow, elongated flat, heated die medially lengthwise of the juxtaposed strips in a limited median region substantially less than the total width thereof to effect at least a median-zone partial bonding of the adhesive for tacking the backbone strips together, and thereafter transporting the casing lengthwise of the backbone into position with said backbone strips situated between heated, elongated, rounding dies relative to which the tacked zone is centrally and longitudinally aligned and forcibly closing the dies onto the backbone strips in a forming operation to impart a crosswise curvature thereto flanking said zone, and continuing such forming operation until said adhesive has acquired a substantial bonding throughout the interface between said strips sufficient to hold the curvature of the backbone strips to a predetermined condition of rounding.

25. The process of making book casings with rounded backs which comprises utilizing a casing blank consisting of a flat, elongated backbone strip hingedly joined to a pair of flanking cover boards, superimposing a second backbone strip of substantially the same size as the first-mentioned casing strip in register upon the inside face of the latter; providing a layer of fast-acting thermobonding polyvinyl acetate adhesive between the interfaces of said strips, whereby to provide a casing assembly in flat condition; subjecting said assembly to rounding in a set of heated dies arranged in series, the first die of said series having a die face the length of said backbone strips but substantially narrower than the width thereof for pressing engagement with the assembled strips in a narrow central tacking zone, to leave unbonded flanking zones along opposite longitudinal margins of the strips, there being a plurality of succeeding rounding dies in said set each having the length of one of said strips and a transversely-curved width in conformity substantially with the desired rounding to be imparted thereto; means for feeding said casing assemblies successively into and through said set of dies beginning with said tacking die with a pause of predetermined short duration of each casing at each die; said tacking die initially bonding the assembly strips in register without bonding portions beyond said narrow zone whereby to leave initially unbonded areas on opposite sides thereof free for joint movement into bonded curvilinear conformation in succeeding dies.

26. Apparatus for making rounded-backed book casings from prepared flat manufactured cases each consisting of a flat, elongated backbone strip hingedly attached to a pair of flanking covers; said apparatus comprising: bed means supporting said casings in flat, open condition for advance relative to a plurality of stations therealong; a first heated die means at a first one of said stations and including a heated, elongated, flat, pressing-die member having at least the length of said strip and a width substantially less than the width of said strip and mounted to move into and out of pressing engagement with a longitudinal central zone in another sister backbone strip of substantially the same size as the first strip carried in registration upon the latter on a casing at said first station and having a layer of fast-acting thermobonding adhesive disposed over the entire area of the interface between said strips, to bond the latter together initially only in said zone commencing with pressing engagement of said first heated pressing-die member therewith, whereby to leave longitudinally-extensive unbonded zones of substantial area and lateral width between the strips flanking said central zone; and heated rounding die-means supported relative to said bed at a station succeeding the first one and including elongated movable and rounded pressing-die means of substantially the same length as said first die member and a curvilinear width corresponding to the round-backed curvature to be imparted to the strips and casing back; said rounding die means being longitudinally centrally aligned relative to said bed means in feeding relation with said first die means to receive from the latter flat casings with zonally-bonded sister strip as aforesaid in registering longitudinal and lateral alignment with said pressing die member such that the rounding pressures and heat will be simultaneously applied to both unbonded zones as the strips are pressed into the matrix; means for advancing said casings in the bed means serially into and out of pressing position relative to said die means at said stations beginning with the first one, and providing a brief dwell for each casing at each said station; and means operating in timed coordination with said moving means for operating said movable die members in pressing action as aforesaid within the interval of said dwell.

27. In a machine for making round-backed book casings from flat manufactured cases which consist of a flat, elongated backbone strip of tarboard or the like having a pair of flanking covers hingedly joined thereto, bed means for positioning said casings in flat open condition for feeding movement in a linear series relative to a plurality of die stations situated in succession therealong; a first, elongated, heated, pressing die means including a movable die member having a die face at least as long as said backbone strip but substantially narrower than the width thereof and movably mounted to press down upon another backbone strip along a narrow centralized zone lengthwise thereof, said other backbone strip being of substantially the same size as the first-mentioned strip and disposed in registered assembly upon the latter with the casing positioned for feeding advance on the bed means as aforesaid with a layer of fast-acting thermobonding adhesive disposed between the strips and acting to fixedly bond the same together only in said zone responsive to pressing action thereon by said die member, whereby to leave extensive elongated marginal zones unbonded on both sides of said central zone; and heated rounding die means including a movable pressing die member of a length substantially the same as that of said first die face and said strips and having a curvilinear width substantially equal to that of the two strips in the desired condition of round-backed curvature of the casing, said rounding die means being longitudinally centrally aligned with said first die means and die face to receive therefrom the flat case with centrally bonded sister strips; means for moving said cases in feeding advance serially into and out of pressing position relative to all of said die means in succession with a short dwell of each casing at each die means; and means cooperatively actuated and timed in coordination with said moving means for moving said die means into and out of pressing engagement with a casing at rest thereat during said dwell.

28. Mechanism for fabricating round-backs on flat casings by joining and rounding flat backbone-strip assemblies by means of a thermobonding adhesive interposed between the interfaces of the strips in the flat assembly, said mechanism comprising: a series of heated, closable dies, the first of which is a zonal bonding die having a narrow substantially flat die face of the same length as, but substantially lesser width than, the strips for bonding the same in a narrow, centralized longitudinally-extensive median zone leaving corresponding unbonded zones of substantial lateral width on opposite sides of the central zone along the length of the strips; the succeeding dies being over-all rounding dies having at least the length of the strips and laterally curvilinear die faces substantially equal in area to the area of the strips in the desired curved condition; means for unidirectionally feeding said assemblies into and away from said dies seriatim in steps including a brief dwell for each assembly at each die; and means for briefly actuating said dies between the limits of the interval of said dwell to close upon assemblies fed thereto.

29. A process for the in situ manufacture of book covers of the round-back type comprising a rounded backbone with a set of flanking covers hingedly attached thereto, which process comprises the use of a set of said covers in which the backbone is a bendable strip initially in flat condition; superimposing a bendable sister backbone strip, also initially in flat condition, in register upon said first strip; providing between the interfaces of said strip a thermobonding adhesive and supporting said set of covers and superimposed sister strip on a substantially horizontally flat bed; applying heat and pressure to said strips in flat condition along a narrow, median longitudinal area substantially less than the area of said interfaces to tack the same against movement out of register in subsequent rounding deformation; and thereafter applying an over-all heat and pressure to said strips repetitiously by advancing the same through a succession of heated rounding dies without allowing the strips to cool substantially between successive advances, thereby simultaneously completing the bonding throughout said interfaces thereof and deforming the strips into a concavo-convex curvature which is lateral to the length thereof.

30. A process for the manufacture of book casings with rounded backs, said process comprising the use of a prepared casing initially having covers attached to a flat backbone panel of bendable fibre board having the characteristics of book binder's board and the like; providing in registered assembly with said first-mentioned panel at least one further panel of like material; providing between the interfaces of the panels in said assembly a film of thermoplastic adhesive comprising essentially polyvinyl acetate having a molecular weight attaining to about 500,000 and workable in film form to bond with said material under pressure of about 40 to 60 p.s.i., and heat in a melt-seal temperature range of the order of about 250° F. to 260° F.; and simultaneously bonding and bending said assembly to a predetermined lateral curvature by subjecting the same in a rapid succession of stages to a plurality of forming operations between successive die means applying pressure and heat thereto of the order aforesaid for dwell periods of the order of about 5 seconds in each die means; and thereby bonding the panels of said assembly in a first stage of said forming operations in a flat condition and in a limited centralized area substantially less than the total interfacial area between any pair of confronting panels, and thereafter laterally bending said assembly increasingly to said predetermined curvature concurrently with a complete bonding of the panels throughout the interfacial areas thereof confronting said adhesive film without any substantial cooling of the assembly or panels from one stage to another throughout said forming operations.

31. A machine for forming backbone structures in situ in book cases by joining flat strip elements to a flat backbone strip in the casing with a thermoplastic adhesive included between the strip interfaces, said machine including: a closable tacking die, at least one closable rounding die, feed means for advancing casings seriatim into and out of operative relation to said dies beginning with said tacking die; die-actuating means for opening and closing said dies; means coordinating the operation of said feed means and said die-actuating means to hold said dies open during advance of casings into and out of operative positions relative thereto; and means for transferring heat energy into said backbone structures and the included adhesive while the same are operatively engaged with said dies.

References Cited in the file of this patent

UNITED STATES PATENTS

| | | |
|---|---|---|
| 343,439 | Crane | June 8, 1886 |
| 391,226 | Ogden | Oct. 16, 1888 |
| 490,895 | Bredenberg | Jan. 31, 1893 |
| 800,115 | Kroencke | Sept. 19, 1905 |
| 857,003 | Kroencke | June 11, 1907 |
| 1,790,901 | Cosgrove | Feb. 3, 1931 |
| 2,486,330 | Schade | Oct. 25, 1949 |
| 2,607,709 | Simpson | Aug. 19, 1952 |
| 2,635,262 | Schramm | Apr. 21, 1953 |
| 2,636,195 | Hicks | Apr. 28, 1953 |
| 2,645,795 | Pitner | July 21, 1953 |
| 2,772,427 | Rankin | Dec. 4, 1956 |
| 2,853,725 | Schoenberger | Sept. 30, 1958 |
| 2,893,022 | Schoenberger | July 7, 1959 |
| 2,921,322 | Crawley et al. | Jan. 19, 1960 |